US012800282B2

(12) United States Patent
Rognlien et al.

(10) Patent No.: US 12,800,282 B2
(45) Date of Patent: Nov. 17, 2026

(54) MULTI-EDGED TOOL FOR USE ON STRINGED INSTRUMENTS

(71) Applicant: Music Nomad, LLC, Sonoma, CA (US)

(72) Inventors: Rand Rognlien, Sonoma, CA (US); Pieter Schouten, Berkeley, CA (US); Jonathan Jones, Sonoma, CA (US)

(73) Assignee: Music Nomad, LLC, Sonoma, CA (US)

( * ) Notice: Subject to any disclaimer, the term of this patent is extended or adjusted under 35 U.S.C. 154(b) by 457 days.

(21) Appl. No.: 18/115,953

(22) Filed: Mar. 1, 2023

(65) Prior Publication Data

US 2024/0295391 A1 Sep. 5, 2024

(51) Int. Cl.

| | |
|---|---|
| ***G01B 3/56*** | (2006.01) |
| ***G01B 3/04*** | (2006.01) |
| ***G01B 5/14*** | (2006.01) |
| ***G01B 5/24*** | (2006.01) |
| ***G10D 3/00*** | (2020.01) |

(52) U.S. Cl.

CPC ................. *G01B 3/56* (2013.01); *G01B 3/04* (2013.01); *G10D 3/00* (2013.01); *G01B 5/14* (2013.01); *G01B 5/24* (2013.01)

(58) Field of Classification Search

CPC ... G01B 3/04; G01B 3/56; G01B 5/14; G01B 5/24; G10D 3/00

USPC ......... 33/483, 494, 533, 534, 535, 758, 833; 84/293; 409/131, 133, 202, 203; 984/110

See application file for complete search history.

(56) References Cited

U.S. PATENT DOCUMENTS 2,423,779 A * 7/1947 Kahn ........................ B43L 7/08 33/666
2,438,653 A * 3/1948 Ware ......................... B43L 7/00 33/483
2,504,251 A * 4/1950 Coffey ...................... B43L 7/00 33/484

(Continued)

FOREIGN PATENT DOCUMENTS

EP 2608194 B1 * 12/2019 ............... G10D 3/22
JP 3831105 B2 * 10/2006

OTHER PUBLICATIONS

Screen captures from YouTube video clip entitled "Make pro guitar luthier tools out of stuff you have (Guitar Hack #1)", 3 pages, uploaded on Apr. 13, 2017 by user "GunsandGuitars". Retrieved from Internet: < https://www.youtube.com/watch?v=Nnzms8dZdVM>. (Year: 2017).*

12" Triangular Architect Drafting Scale. Datasheet [online]. Alumicolor Precision Tools, 2019 [retrieved Jul. 24, 2025]. Retrieved from the Internet: <URL: http://www.alumicolor.com/product/scales-hollow-flw.htm>. (Year: 2019).*

(Continued)

*Primary Examiner* — Natalie Huls
*Assistant Examiner* — Daniel M Quinn
(74) *Attorney, Agent, or Firm* — BOND, SCHOENECK & KING, PLLC; George R. McGuire

(57) ABSTRACT

A tool having an elongated body that is triangular in cross-section such that it includes three elongated straight edges with major surfaces extending between two edges. The straight edges are of differing lengths so as to be used on instruments of different scale sizes and may also include notches formed at intervals along the length of the edge. The edges with notches can be used on a fretboard having frets already in place with the edge being positioned on the fretboard with a fret extending into each notch.

4 Claims, 12 Drawing Sheets

(56) References Cited

U.S. PATENT DOCUMENTS

| | | | | | |
|---|---|---|---|---|---|
| 2,579,664 | A * | 12/1951 | Gleasman | G01B 3/04 | 33/492 |
| 2,673,399 | A * | 3/1954 | Raeder | G01B 3/04 | 33/485 |
| 3,310,878 | A * | 3/1967 | Giba | B43L 7/00 | 33/483 |
| 4,484,395 | A * | 11/1984 | Samuels | G01B 3/04 | 33/494 |
| D280,081 | S * | 8/1985 | Groves | D28/99 | |
| 6,305,093 | B1 * | 10/2001 | Venola | G01C 9/26 | 33/492 |
| 6,782,629 | B2 * | 8/2004 | Jimenez | B43L 7/005 | 33/483 |
| D742,261 | S * | 11/2015 | Halker | D10/64 | |
| 11,435,173 | B1 * | 9/2022 | Gardner | G01B 3/1003 | |
| 2001/0029827 | A1 * | 10/2001 | Chapman | G10D 3/06 | 84/314 R |
| 2006/0005408 | A1 * | 1/2006 | Fernand | B26B 29/06 | 33/471 |
| 2019/0212122 | A1 * | 7/2019 | Hosokawa | G10G 7/00 | |

OTHER PUBLICATIONS

Hexagons. Instructional images [online]. ClipArt ETC, Florida Center for Instructional Technology, College of Education, University of South Florida, 2019 [retrieved Jul. 24, 2025]. Retrieved from the Internet: <URL: http://etcusfedu/clipart/galleries/505-hexagons>. (Year: 2019).*

Screen captures from YouTube video clip entitled "Guitar Straight Edge—Notched + 2-in-1 Precision Luthiers Tool", 2 pages, uploaded on Apr. 12, 2019 by user "StewMac". Retrieved from Internet: <https://www.youtube.com/watch?v=0ftulyU2hQ4>. (Year: 2019).*

Polygons. Educational website [online]. Year 7 Interactive Maths—Second Edition, G S Rehill's Interactive Maths Series, 2022 [retrieved Jul. 25, 2025]. Retrieved from the Internet: <URL: https://web.archive.org/web/20220218104408/https://www.mathsteacher.com.au/year7/ch09_polygons/05_polygon/pol.htm>. (Year: 2022).*

2-in-1 Precision + Notched Straight Edge. Datasheet [online]. StewMac, 2022 [retrieved on Jul. 24, 2025]. Retrieved from the Internet : <URL: https://web.archive.org/web/20220705101045/https://www.stewmaccom/luthier-tools-and-supplies/types-of-tools/straightedges/2-in-1-precision--notched-straightedge/>. (Year: 2022).*

* cited by examiner

MULTI-EDGED TOOL FOR USE ON STRINGED INSTRUMENTS

CROSS-REFERENCE TO RELATED APPLICATION

N/A

FIELD OF THE INVENTION

The present disclosure is directed generally to straight edges used when working on the finger board of a stringed instrument.

BACKGROUND

Straight edges are commonly used when building or servicing a stringed instrument. More particularly, straight edges are used to gauge flatness of fingerboard and/or frets. For example, by laying a straight edge across the frets, observations may be made as to whether the fret tops are perfectly level. If building a new fretboard, a straightedge can be laid across the fingerboard to check for any dips or bumps that might need further sanding. When constructing a new guitar, the straight edge can be used to check body joints or on a solid body electric guitar, for example, the straight edge can be used to ensure the body is perfectly flat prior to mounting the electrical components.

Luthiers and others who service stringed instruments typically have a two-edged straight edge, much like a ruler. One edge may be notched to accommodate frets while the other edge is completely flat, or the two edges may have different straight lengths to accommodate different scale lengths. The notched edge includes notches at intervals that correlate to the distance between frets and is useful when checking the flatness of a fretboard that includes frets already mounted with each notch being positioned over a fret and the straight edge laying across the board between the frets.

Due to different stringed instruments having different scale lengths and different fret patterns, several straight edges are typically needed to be able to service these different instruments.

Accordingly, there is a need in the art for a tool that includes three or more straight edges each of which is designed to be used for a different task or on a different instrument.

SUMMARY

The present disclosure is directed to a multi-edged tool for use on stringed instruments.

According to an aspect is a tool for use with a stringed instrument, comprising an elongated body having at least three edges and at least three major surfaces, wherein at least one edge includes a first plurality of notches formed in the edge in spaced relation to one another each notch being a first predetermined distance from the adjacent notch, and at least one edge includes a second plurality of notches formed in the edge in spaced relation to one another each notch being a second predetermined distance from the adjacent notch that is different than the first predetermined distance.

According to an embodiment, at least one edge includes a continuous straight edge that extends the length of the edge.

According to an embodiment, at least one edge includes a continuous straight edge without notches formed therein but that extends less than the length of the tool.

According to an embodiment, the tool further comprises a hole formed through at least one of the concave surfaces.

According to an embodiment, wherein each of the at least three major surfaces are concave.

According to an aspect is a tool for use with a stringed instrument, comprising an elongated body having at least three major surfaces and at least three edges each of which extends in spaced, parallel relation to the others, wherein at least one edge extends a first predetermined distance, and at least one edge extends for a second predetermined distance that is different than the first predetermined distance, and at least one edge extends for a third predetermined distance that is different than the first and second predetermined distances.

According to an embodiment, the tool further comprises a hole formed through at least one of the concave surfaces.

According to an embodiment, wherein each of the at least three major surfaces are concave.

According to an embodiment, a first concave surfaces include a first set of measurement marks formed thereon and a second concave surface includes a second set of measurement marks formed thereon which are different from the first set of measurement marks.

According to an embodiment, the first set of measurement marks is a SAE ruler and the second set of measurement marks is a metric ruler.

According to an embodiment, the tool further comprises a plurality of guitar and bass scale lengths formed on at least one major surface.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a straight edge tool having at least three edges for use in working on a stringed instrument. The tool is used when building or performing service on a stringed instrument. The straight edge is placed on a surface that is supposed to be perfectly straight and the if light shines between any portion of the edge and the instrument, the user knows that area of the instrument is in need of straightening. For example, if the edge is placed on a fretboard and light shines through between the bottom of the edge and the fretboard, it suggests the user would need to straighten the neck to make it perfectly straight.

Figure 1:
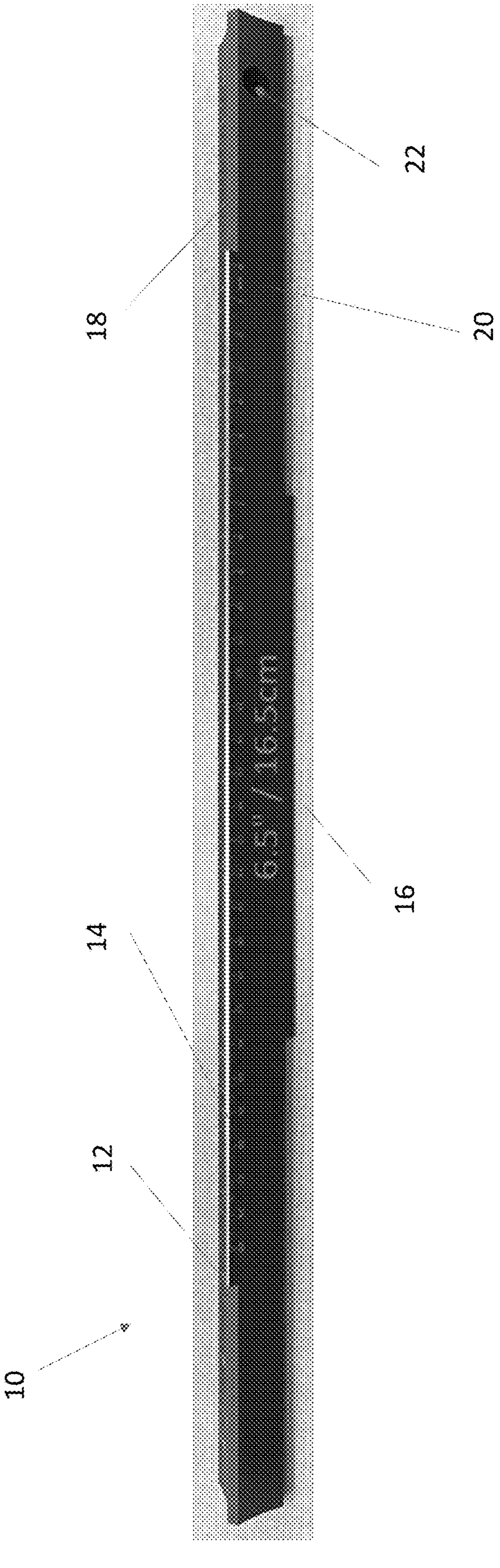
FIG. 1 is a top plan view of a straight edge tool having three edges, in accordance with an embodiment.
Figure 2:
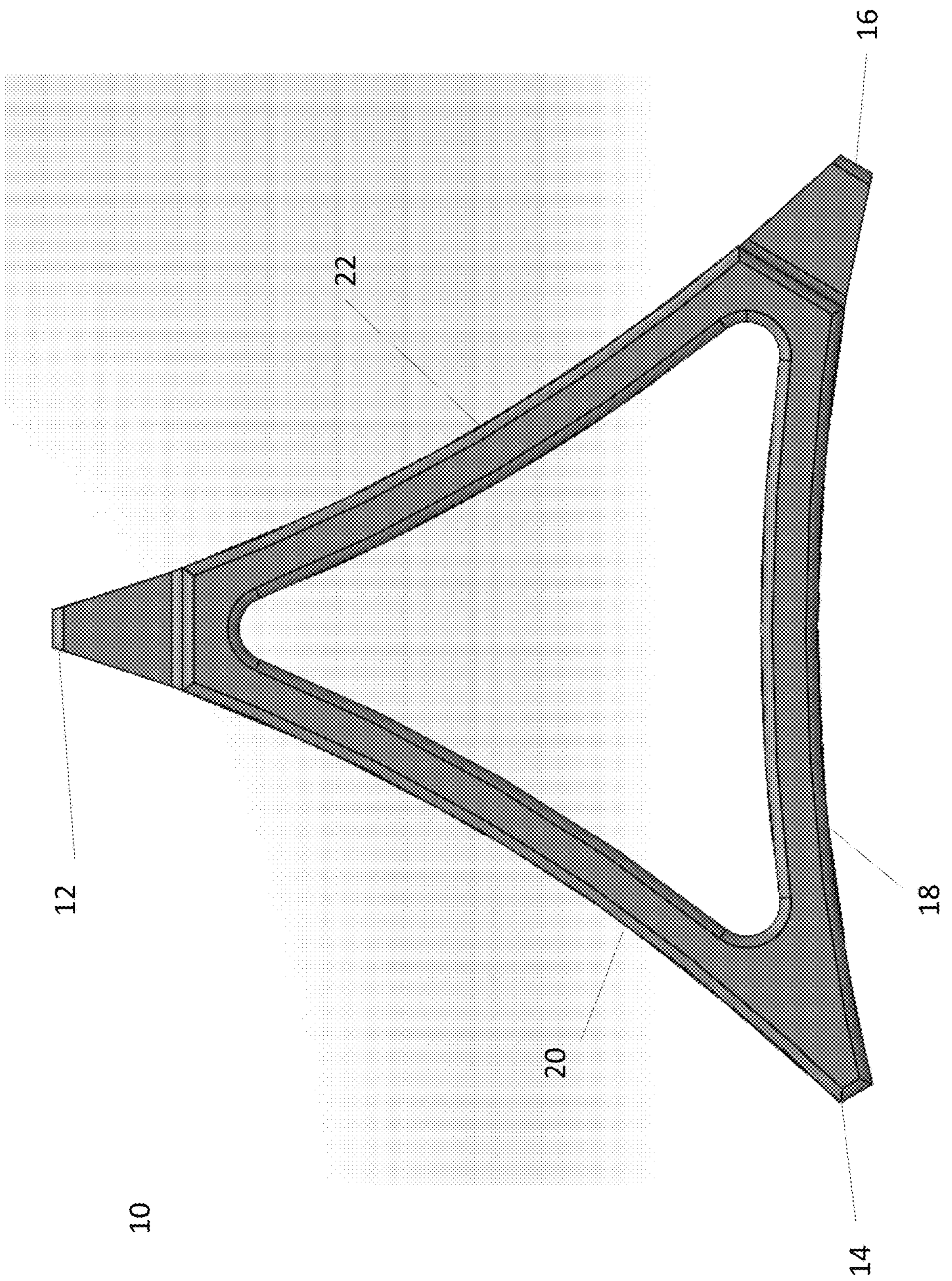
FIG. 2 is an end elevation view of a straight edge tool having three edges, in accordance with an embodiment.
Figure 3:
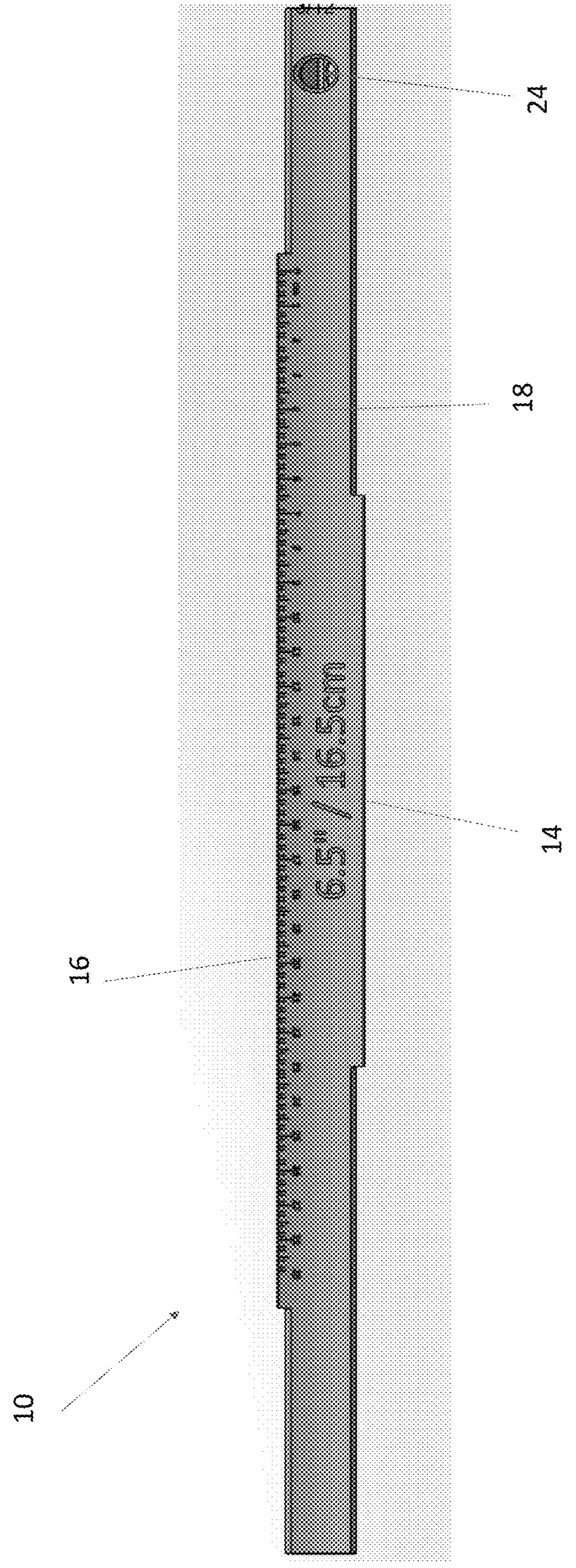
FIG. 3 is a first side elevation view of a straight edge tool having three edges, in accordance with an embodiment.
Figure 4:
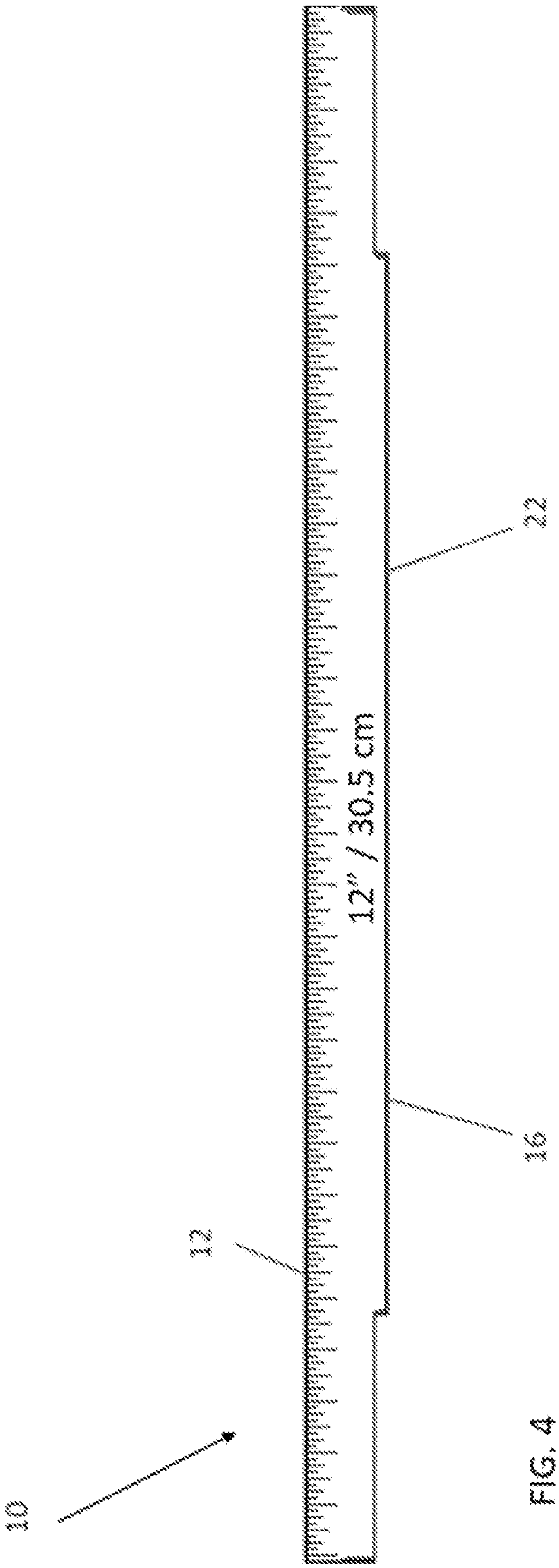
FIG. 4 is a second side elevation view of a straight edge tool having three edges, in accordance with an embodiment.
Figure 5:
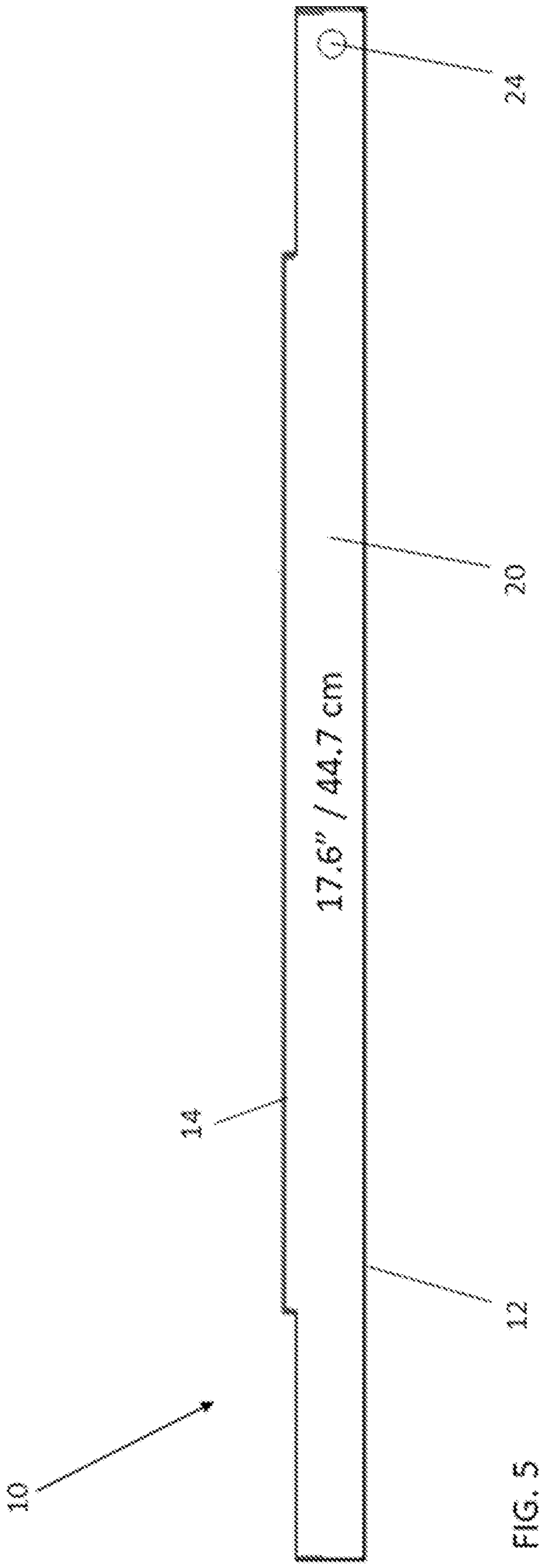
FIG. 5 is a third side elevation view of a straight edge tool having three edges, in accordance with an embodiment.

Referring to FIG. 1, in one embodiment, is a straight edge tool 10 having a triangular cross-sectional shape comprising three elongated straight edges, 12, 14, and 16 each one of which is used for a different purpose, different instrument, or differently sized instrument. For example, edges 12, 14 and 16 may be 17.6 inches, 12 inches, and 6.5 inches in length, respectively, which are suitable for working on guitars having different scale lengths, and other instruments, such as, for example, a mandolin, ukulele, or banjo.

Tool 10 also includes three major, preferably concave, surfaces 18, 20, and 22 that each extend between two edges. Printed or engraved into each convex surface are SAE and Metric rulers as well as a plurality (e.g., 13) guitar and bass scale lengths so the user can quickly and easily check the scale length on which he or she is working on. Furthermore, tool 10 may be used to extend from the 12th fret of a guitar, for example, to check the approximate bridge placement on the instrument. A hole 24 is formed through one surface 16, 18 or 20 to provide a convenient mechanism to hang tool 10 when not in use.

Figure 6:
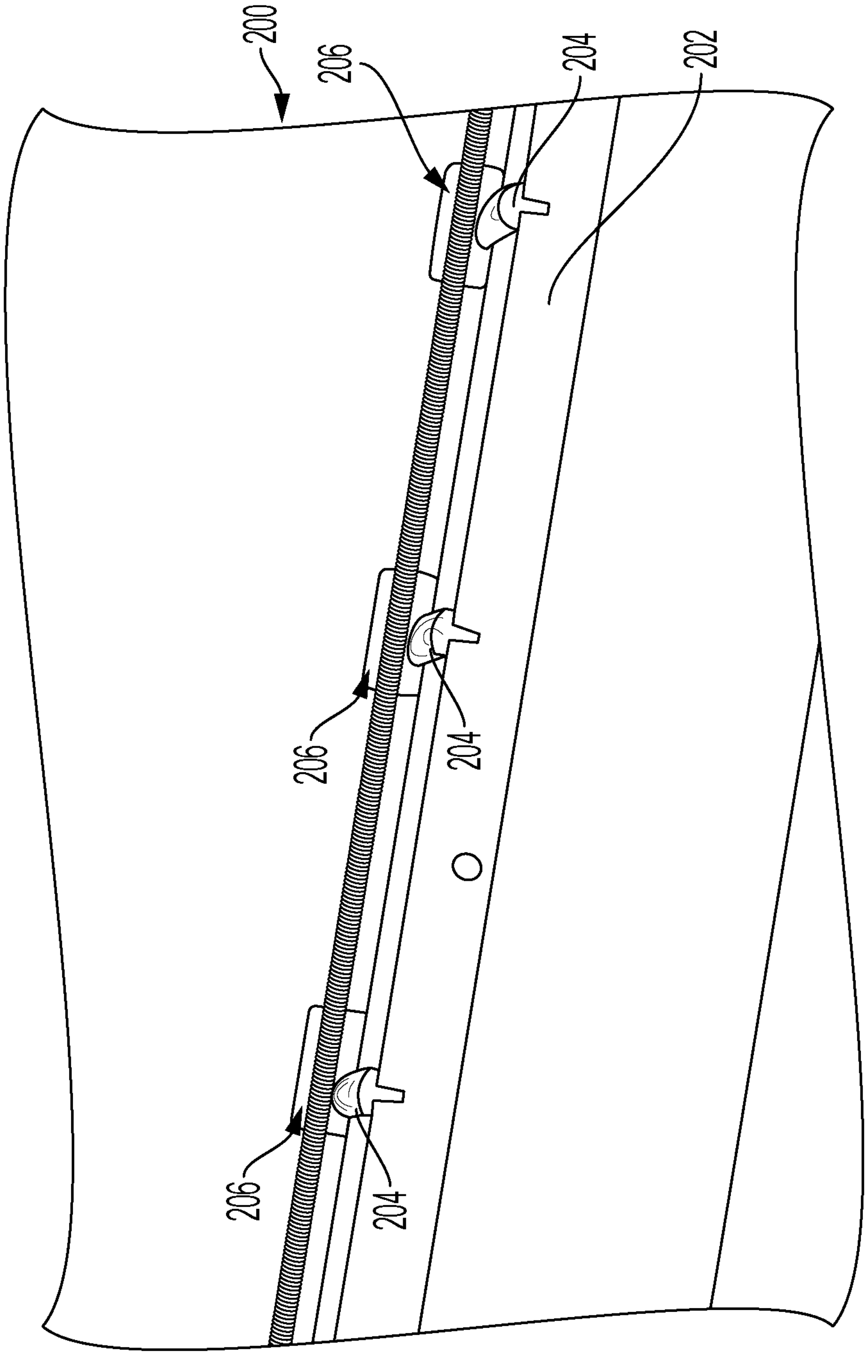
FIG. 6 is a perspective view of a conventional notched straight edge tool in place on a fretboard for illustrative purposes.

Referring to FIG. 6, use of a conventional notched straight edge 200 on a fretboard 202 is shown for illustrative purposes. The notched straight edge 200 includes notches 204 formed at intervals that correspond with the distance between frets 206 on fretboard 202 such that each fret 206 will be positioned within a notch 204 when the straight edge 200 is placed on fretboard 202. The straight edge portions 208 extending between notches 204 all extend along a common axis providing a straight edge for determining the straightness of the neck/fretboard and whether adjustments are needed to the neck to straighten it.

Figure 7:
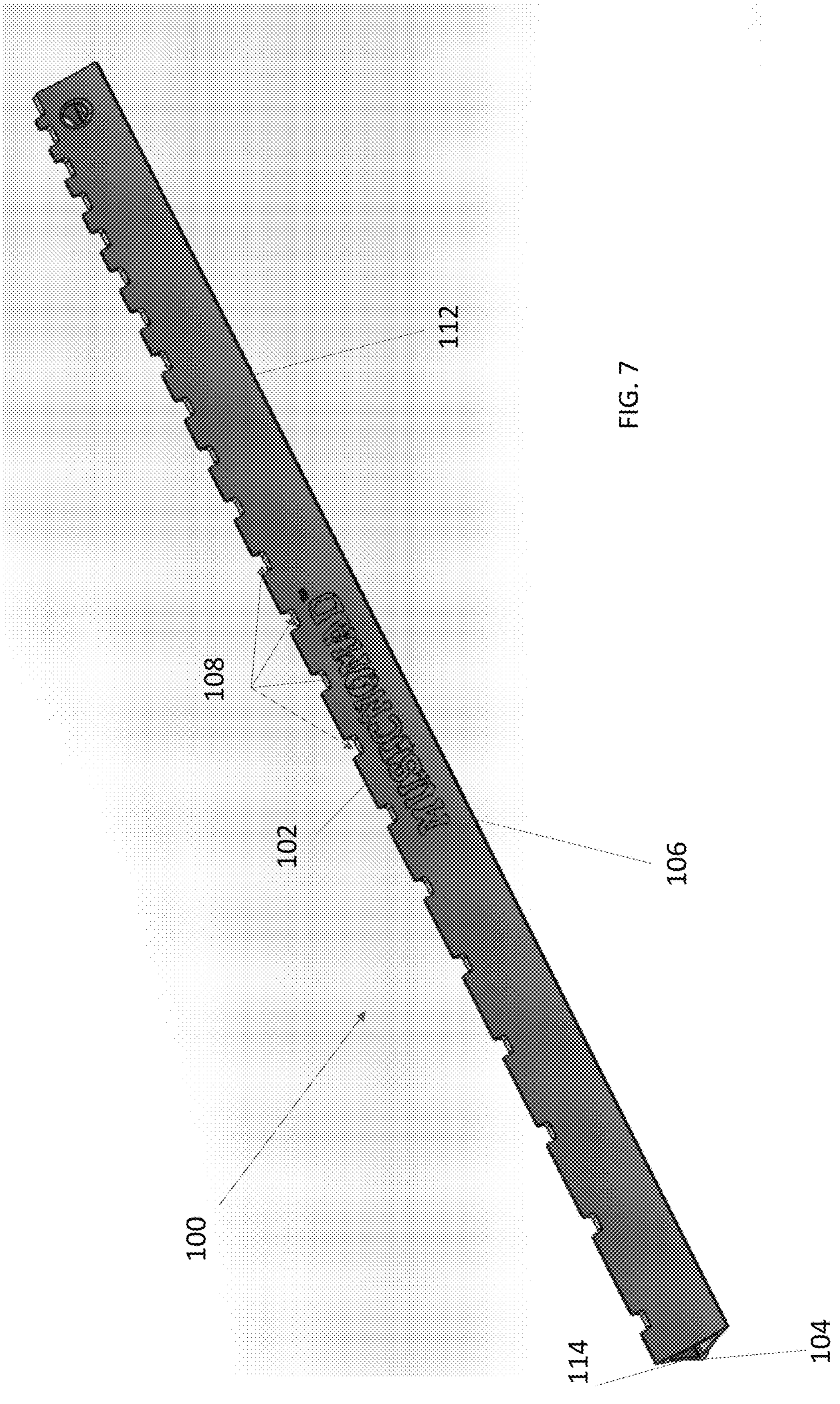
FIG. 7 is a first perspective view of a notched straight edge tool having three edges, in accordance with an embodiment.
Figure 8:
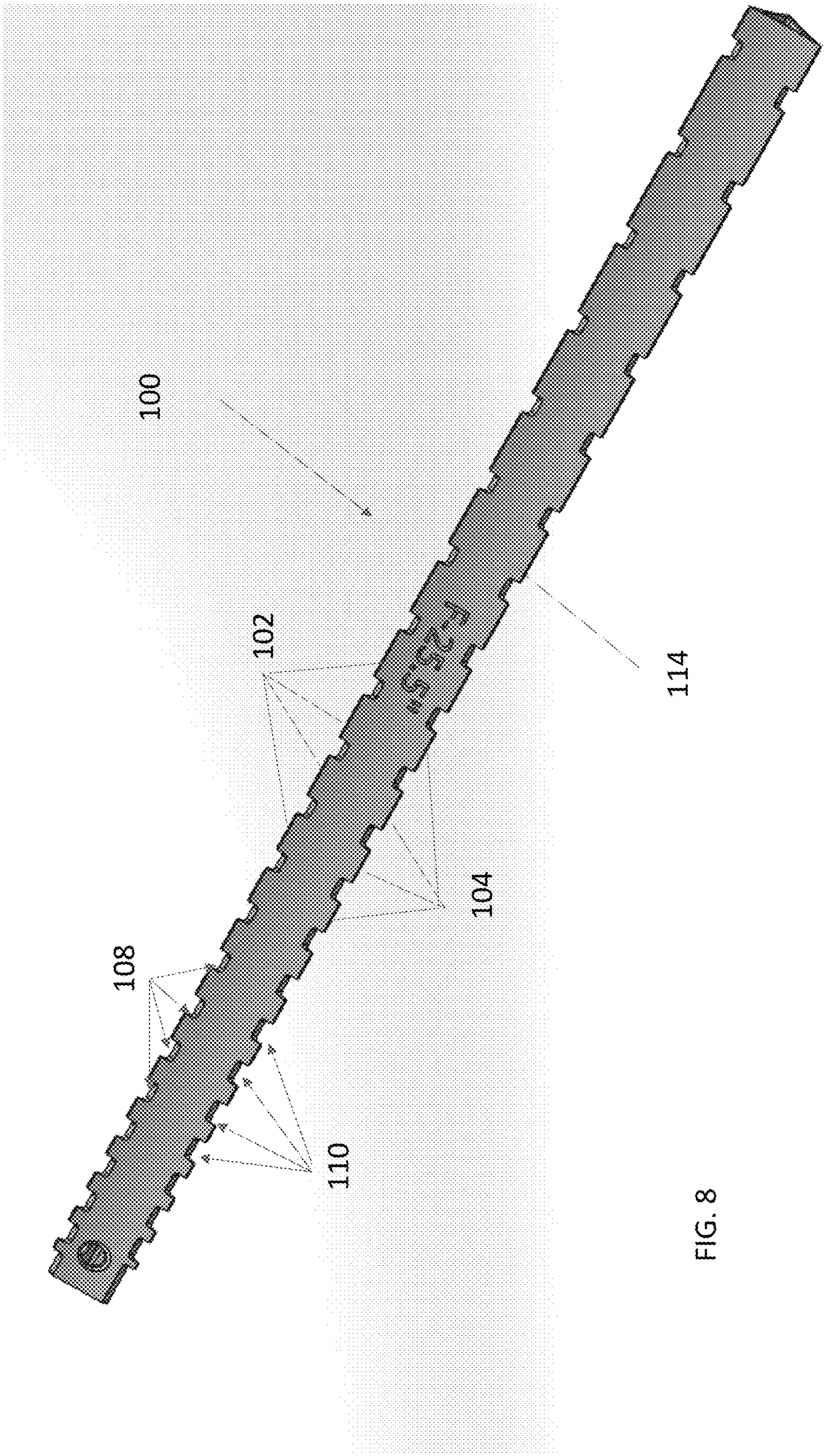
FIG. 8 is a second perspective view of a notched straight edge tool having three edges, in accordance with an embodiment.
Figure 9:
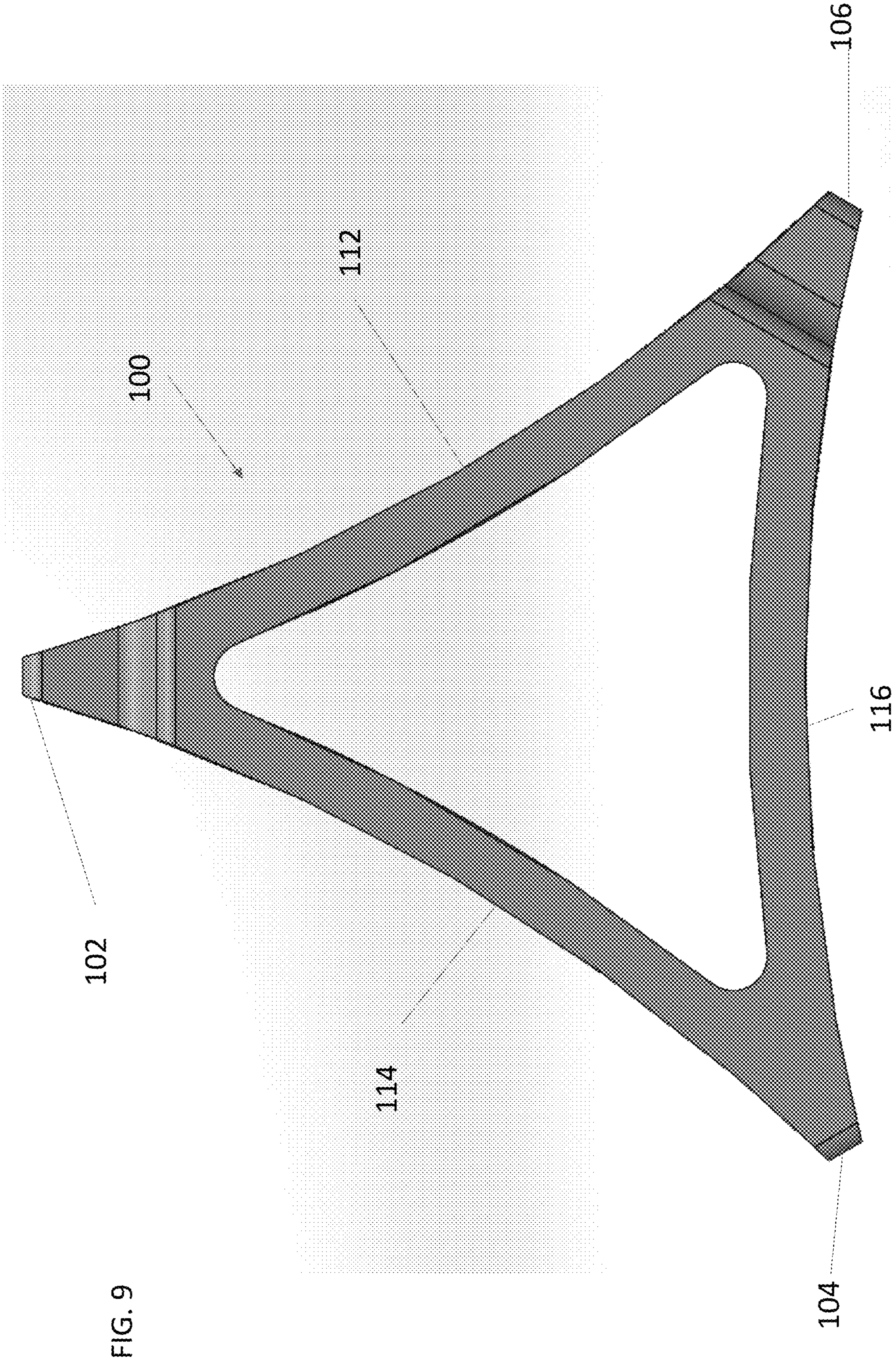
FIG. 9 is an end elevation view of a notched straight edge tool having three edges, in accordance with an embodiment.
Figure 10:
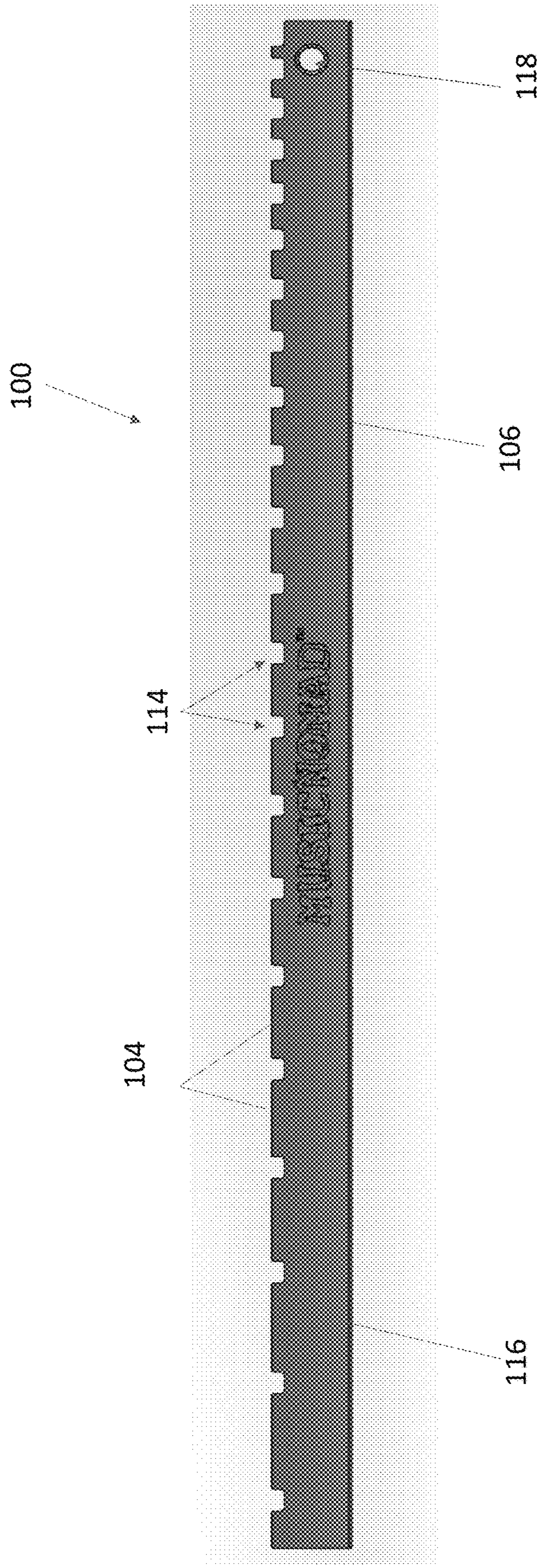
FIG. 10 is a first side elevation view of a notched straight edge tool having three edges, in accordance with an embodiment.
Figure 11:
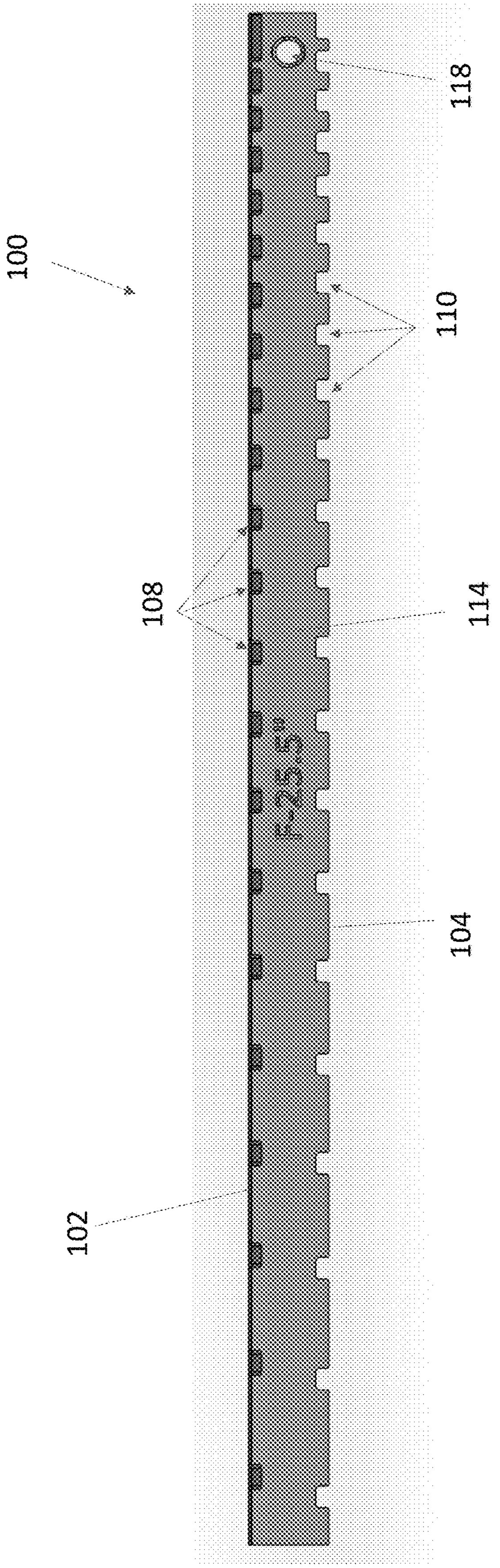
FIG. 11 is a second side elevation view of a notched straight edge tool having three edges, in accordance with an embodiment.
Figure 12:
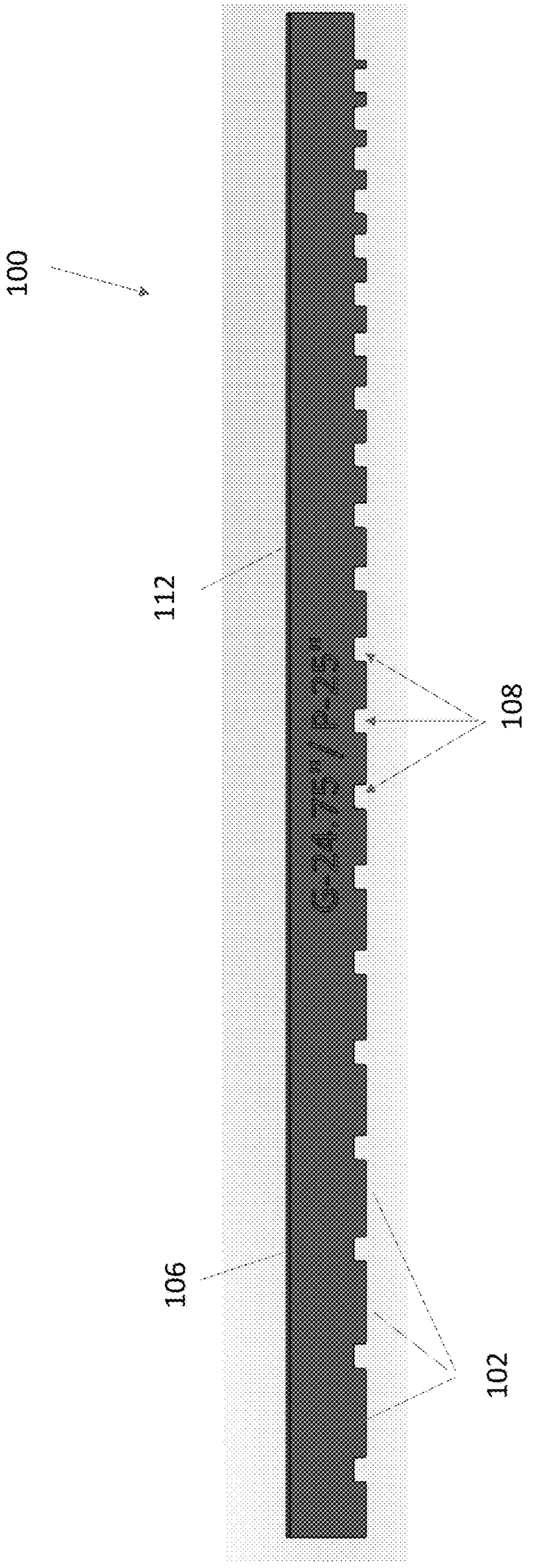
FIG. 12 is a third side elevation view of a notched straight edge tool having three edges, in accordance with an embodiment.

Referring to FIG. 7, in another embodiment, is a straight edge tool 100 having a triangular cross-sectional shaped body comprising three elongated edges, 102, 104, and 106 each one of which is used for a different purpose, different instrument, or differently sized/scaled instrument. Two of the sides 102 and 104 include a plurality of notches 108, 110, respectively, cut-out therefrom with each notch being a predetermined distance from the adjacent notch(es) and where the distance between notches 108 is shorter than the distance between notches 110. This notching and the spacing between notches 108, 110 facilitates use of these edges on fretboards having frets already set thereon so that the frets can be positioned within the notches and the straight edges 108, 110 extending between notches can be laid across the fretboard to perform the necessary work. The third edge 106 is simply a straight edge of predetermined length, 17.6 inches for example, much like edge 16, to use on a fingerboard or other area of a stringed instrument. Tool 100 also includes three major, preferably concave, surfaces 112, 114, and 116 that each extend between two edges.

The notched straight edge 100 can be used to check the flatness of a fretboard, to assist in fretwork with notches that cover 17.6" of the fretboards and touch the fretboard between 22 fret slots. In addition, tool 100 works for most electric and acoustic guitars fitting all 25.25" to 25.50" scale guitars. An alternate size can be used on all guitars with scale lengths ranging from 24.625" to 25". Toll 100 can be used to, among other functions, measure neck relief to see if adjusting the truss rod is necessary. A hole 118 is formed through one surface 112, 114, or 116 to provide a convenient mechanism to hang tool 100 when not in use.

Each straight edge 12, 14, 16, 102, 104, and 106 are precision ground to ensure smooth flat edges within an accuracy tolerance of +/−0.00125"/ft. Each tool 10, 100 is manufactured from premium 6063-T5 aluminum with a blue anodized finish that is extremely durable, abrasion resistant and does not peel or chip, thereby ensuring straightness over their entire length and they will not bend.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A tool for use with a stringed instrument, comprising an elongated triangular cross-section body having at least first, second and third edges and at least three external, longitudinally extending major surfaces, each major surface extending between a respective pair of adjacent edges, wherein each of the at least three major surfaces is concave, and wherein the first edge includes a first plurality of notches formed in the first edge in spaced relation to one another with each notch in the first plurality of notches being a first predetermined distance from the adjacent notch, and the second edge includes a second plurality of notches formed in the second edge in spaced relation to one another each notch in the second plurality of notches being a second predetermined distance from the adjacent notch, the second predetermined distance being different than the first predetermined distance, wherein the first and second plurality of notches are each laterally-opening recesses provided in respective the first and second edges and are dimensioned to receive individual frets and paced in accordance with successive fret positions of distinct instrument scale lengths, and wherein each of the at least first, second, and third edges extend in mutually parallel fashion along the triangular cross-section body.

2. The tool according to claim 1, wherein at least one of the first, second and third edges includes a continuous straight edge that extends the length of the edge.

3. The tool according to claim 1, wherein at least one of the first, second and third edges includes a continuous straight edge without notches formed therein but that extends less than the length of the tool.

4. The tool according to claim 1, further comprising a hole formed through at least one of the planar faces.

* * * * *